No. 620,873. Patented Mar. 7, 1899.
L. ISAACS.
GLOVE STRETCHER.
(Application filed Nov. 21, 1898.)
(No Model.)
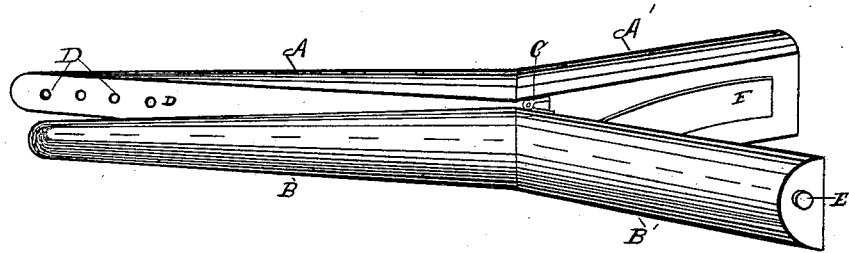
Witnesses
W. T. Humbert
A. C. Spreng.
Louis Isaacs
Inventor
By Hazard + Harpham
Attorneys

United States Patent Office.

LOUIS ISAACS, OF LOS ANGELES, CALIFORNIA.

GLOVE-STRETCHER.

SPECIFICATION forming part of Letters Patent No. 620,873, dated March 7, 1899.

Application filed November 21, 1898. Serial No. 697,079. (No model.)

*To all whom it may concern:*

Be it known that I, LOUIS ISAACS, a citizen of the United States, residing at Los Angeles, county of Los Angeles, State of California, have invented a new and useful Glove-Stretcher and Powder-Box, of which the following is a specification.

My invention relates to improvements in glove-stretchers consisting of two hinged members, one or both of which is hollow; and the object of my improvement is to inject the necessary powder into the glove at the time it is being stretched, and thereby save the time and work involved in introducing the powder after the glove is stretched, and also to avoid the necessity of having a separate receptacle for the powder, which is often misplaced. I attain this object by means of the mechanism illustrated in the accompanying drawing, forming a part thereof, in which—

A B are hollow arms having hollow handles A' B', connected together by the hinge C. Near the outer end of the handle A', on its inner side, is attached the spring F, the free end of which presses against the inner side of the handle B'. This spring keeps the arms A and B in close contact when the stretcher is not in use. The arms A and B are cylindrical on their outer sides and flat on their inner sides where they come in contact with each other and increase in taper to the handles, as is usual with glove-stretchers. The inner surfaces of the arms A and B, near the tips thereof, have small perforations D, shown in the drawing only in the arm A. Each of the handles A' B' has an aperture closed by a removable cap E, shown in the drawing only in the handle B'. The purpose of this aperture is to provide means whereby the powder is introduced into the interior of the handles and arms. When properly charged, they should be almost, but not quite, full. If cheapness is desired in the manufacture of the stretcher, only one of the members need be hollow.

My stretcher is operated as follows: The interior being nearly filled with glove-powder the tips of the arms are inserted in the glove and the same is stretched in the usual manner, and at the same time the glove, with the stretcher therein, is given a slight shake. This causes a sufficient quantity of the powder contained in the hollow arms to come through the perforations D and to be deposited in the glove.

Having described my invention, what I claim as new, and desire to secure by Letters Patent, is—

A glove-stretcher composed of two members pivotally connected together, one or both of said members being hollow for holding powder and having perforations for the discharge of powder near the tip of the arms and an opening in the handle for the insertion of powder and a spring adapted to close the arms, substantially as described herein.

In witness that I claim the foregoing I have hereunto subscribed my name, this 14th day of November, 1898, at Los Angeles, California.

LOUIS ISAACS.

Witnesses:
   HENRY T. HAZARD,
   G. E. HARPHAM.